Oct. 16, 1934.  F. A. LOWER  1,977,447
TRUCK LOADING APPARATUS
Original Filed July 11, 1932    2 Sheets-Sheet 2
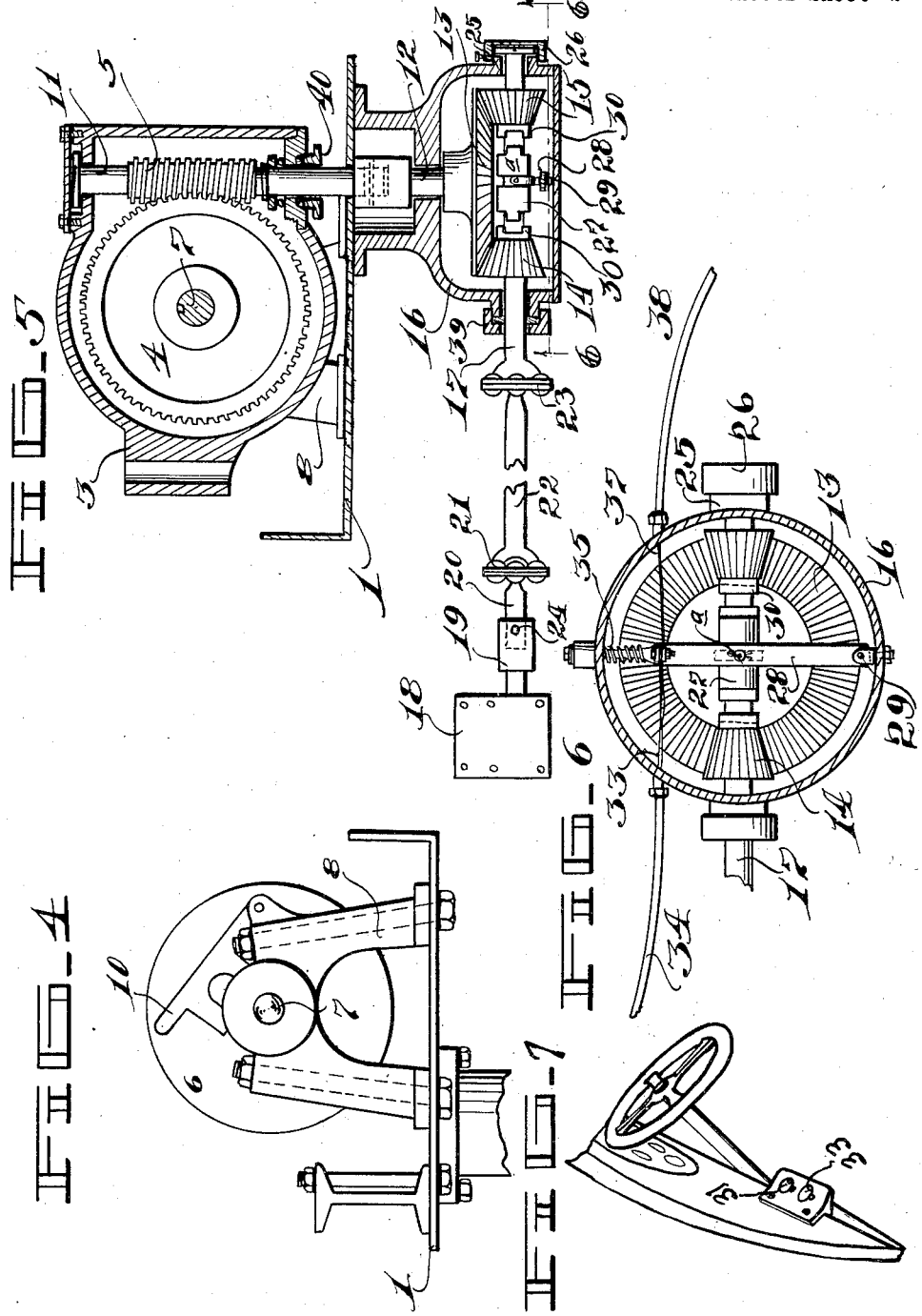
Fredrick A. Lower
INVENTOR
BY
ATTORNEY Patented Oct. 16, 1934

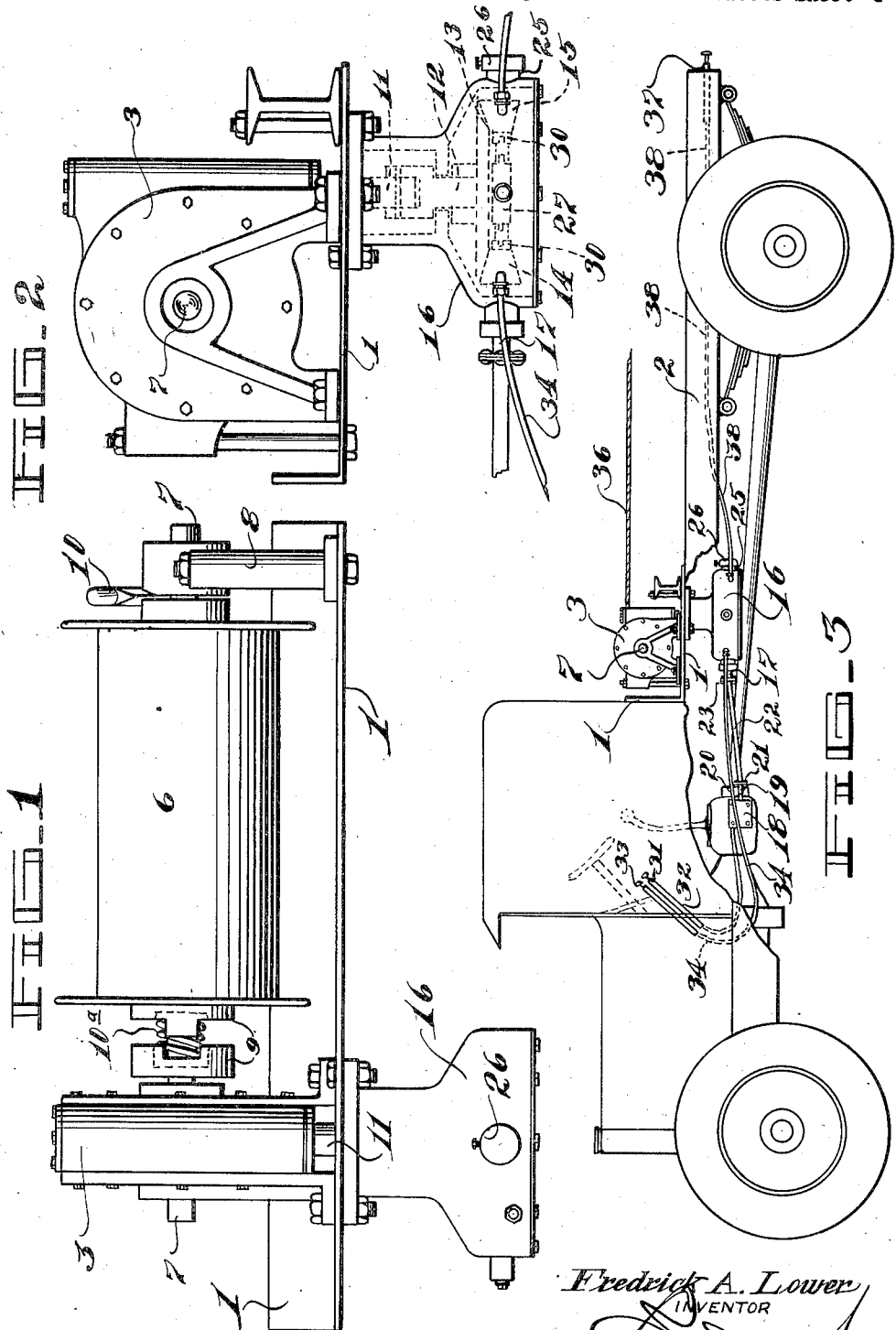

1,977,447

UNITED STATES PATENT OFFICE 1,977,447

TRUCK LOADING APPARATUS

Fredrick A. Lower, Wichita Falls, Tex.

Application July 11, 1932, Serial No. 621,893
Renewed April 18, 1934

3 Claims. (Cl. 254—166)

This invention relates to truck loading equipment and it has particular reference to new and useful improvements in winches.

The principal object of the invention is to provide a combination of elements so constructed and arranged as to minimize the time for loading trucks and to be used, in connection with any common power take-off and so designed as to be light and powerful and occupy only a small amount of space upon the truck on which it is mounted.

Another object of the invention is to provide a winch which is capable of being controlled from either the driver's seat or from the rear of the truck, thus making it possible for one man to load a truck with heavy machinery or the like. Heretofore it has been necessary for an operator to occupy the driver's seat and operate the loading mechanism as directed by attendants.

Yet another object of the invention is to provide an apparatus of the character specified in which the gearing employed may be thrown in and out of engagement by a novel clutching means.

Still, another object of the invention is the provision of a novel clutch by means of which the drum may be disengaged from its actuating mechanism and thus allow the same to revolve freely while a desired length of cable is unwound.

With the foregoing objects as paramount the invention has particular reference to its salient features of construction and arrangement of parts, which will become manifest as the description proceeds, taken in connection with the accompanying drawings wherein:—

Figure 1 is a front elevational view showing the drum and the power transmission unit.

Figure 2 is a side elevational view.

Figure 3 is a side view showing the invention installed on a truck with portions broken away, and showing the control means within the cab and at the rear of the truck.

Figure 4 is a side elevational view of the drum and its supports.

Figure 5 is a view in vertical cross section showing the power take-off and its relationship to the drum and its gear mechanism.

Figure 6 is a view on lines 6—6 of Figure 5, showing the master gear and pinions and the clutching mechanism, and Figure 7 is a view showing the preferred way of applying the front controlling means to the dash.

Continuing with a more detailed description of the drawings, 1 designates the base plate which is bent at a right angle as shown and which is securely bolted to the side frame 2 of the truck.

A housing 3 is bolted to the base plate 1 and encases a worm gear 4 and a worm 5. A drum 6 is freely mounted on the shaft 7 which is supported on one end by the housing 3 and on the other by the standard 8. The gear 4 is keyed to the shaft 7.

A sectional clutch 9 serves to engage the drum 6 for rotation with the shaft 7. The drum 6 is shown in disengaged position in Figure 1, and is forced into engaged position by downward movement of the wedge member 10, against the resistance of a spring 10a.

The worm 5 is carried by the vertical shaft 11, which is suitably connected to a shaft 12 on whose lower end the master gear 13 is keyed. The master gear 13 and the pinions 14 and 15 are encased in a housing 16. The pinions 14 and 15 are normally free to revolve upon the shaft 17, which is connected to the truck transmission 18 or other suitable power take-off through the medium of the coupling 19, shaft 20, universal joint 21, shaft 22 and universal joint 23. The shaft 20 is secured within the coupling 19 by means of the pin 24 which is capable of withstanding the normal load for which the winch is designed but which will shear on application of an excessive overload, thereby protecting the other mechanism from breakage.

It will be observed in Figure 5 that the shaft 17 extends through the housing 16 and its end is journaled in a bearing 25 in the housing and over which there is a cap 26. A clutch element 27 is slidably mounted on the shaft 17, within the housing 16 intermediate the two pinions 14 and 15.

An arm 28, pivoted at 29 in the transmission housing 16, as shown in Figure 6 is provided and is connected at $a$ intermediate its ends to the clutch element 27 in order that movement of the free end of the arm 28 will impart a reciprocating movement to the clutch element 27. In other words, the clutch element 27 is moved into and out of engagement with the clutch elements 30, carried by the pinions 14 and 15. It will be understood that while the flexible coupling comprised of shafts 20, 22 and 17 and the universal joints 21 and 23 may constantly revolve, the pinions 14 and 15 may either idle or be moved into alternate engagement with the master gear 13 to effect clockwise or counter clockwise rotation of the drum 6 through the medium of the vertical shafts 11 and 12.

In order to effect movement of the pinions 14 and 15 as described, a flexible line 31 encased in a flexible sheath or housing 32 is provided which line enters the power take-off unit 18 to effect connection thereof with the transmission of the truck or other vehicle on which the invention is mounted. It is understood, of course, that this connection is or may be conventional. It is however, pointed out that the flexible line 33 and its sheath or housing 34, as shown in Figures 3, 6 and 7, and further reference is directed to Figure 7 as being the preferred way of applying the front control which particularly is a part of the invention and actually sets the same in motion.

Obviously, a pull exerted on the line 33 in the cab of the truck shown in Figures 3 and 7 will move the arm 28, shown in Figure 6, to the left against the resistance of spring 35, which latter is provided to normally hold the pinions in inoperative position relative to the master gear 13. When the arm 28 is so moved, the clutch element 27 is accordingly moved to urge the same into engagement with the corresponding element 30 carried by the pinion at the left of Figure 6. If the motor in the truck is in operation, power is thus transmitted through the power take-off unit 18, through the flexible coupling to drive the master gear 13 through the medium of the pinion 14.

Accordingly, shafts 12 and 11 are rotated and motion is imparted to worm gear 4, through worm 5 which is carried by shaft 11. Since the gear 4 is mounted on the drum shaft 7, the latter is rotated when the clutch elements 9 are in engagement, which is accomplished by depressing the wedge or expander 10. Thus, the cable 36 is wound upon the drum 6 to drag a heavy object onto the bed of the truck.

In order to reverse the direction of rotation of the drum 6, it is simply necessary to push the line 33, which is of sufficient stiffness as to enable the same to actuate the arm 28 to the right in Figure 6. When this is done, the clutch element 29 is accordingly moved and engages the opposite clutch member 30 carried by the companion pinion 15. The flexible coupling therefore transmits motion from the power take-off unit 18 to the pinion 15 and through the master gear 13, shafts 12 and 11, the drum 6 is driven in a direction reverse to that described. When the clutch element is returned to the normal position shown in Figure 5, neither pinion will engage the master gear 13 and the mechanism is idle.

One of the outstanding among the features of the invention lies in the fact that either an attendant or the operator of the truck may actuate the elements of the invention from the rear of the truck equally as well as from within the cab and in so operating the invention he may observe the loading of the truck. This is accomplished by means of a line 37, within a sheath 38, shown in Figures 3 and 6. Connection of the line 37 with the arm 28 is the same as the line 33, previously mentioned and shown specifically in Figure 6. Since the operation in this regard is substantially the same as in the preceding instance, it is not considered necessary to enter into a detailed description thereof except to mention that the operation of one will have no effect upon the other.

It will be understood that both the housing 3 and the housing 16 are filled with a lubricant and suitably packed to prevent leakage, such, for instance as the packing gland 39 for the flexible coupling entering the transmission housing 16 and the gland 40 for the shaft 11 entering the housing 3.

Manifestly, the construction shown and described is capable of considerable modification and such modification as is considered in keeping with the scope and meaning of the appended claims is also considered within the spirit and intent of the invention.

What is claimed is:

1. The combination with a truck, a drum mounted on the floor of said truck having a worm gear fixed to its shaft, a second shaft disposed at right angles with respect to said drum shaft and carrying a worm enmeshed with said worm gear, a beveled gear carried by said second shaft and disposed below the floor of said truck, a shaft arranged diametrically across said beveled gear carrying a pair of gears enmeshing said beveled gears, a clutch for each of said gears, means for driving said diametrical shaft from the power source of said truck and means for actuating said clutches to alternately lock said gears in positive relation to said driving means to change the direction of rotation of said drum.

2. The combination with a truck, a drum mounted on the floor of said truck, a beveled gear disposed below the floor of said truck for imparting rotation to said drum, a flexible drive shaft extending diametrically across the face of said beveled gear, a pair of gears loosely mounted on said drive shaft and enmeshing the teeth of said beveled gear, a clutch slidingly mounted on said drive shaft, an arm also disposed over the face of said beveled gear in transverse relation to said drive shaft and having connection to said clutch, means arranged for remote operation to move said arm to effect alternate engagement of said clutch with said gears to change the direction of rotation of said drum and means for yieldingly holding said arm in adjusted positions.

3. The combination with a truck, a cable drum mounted on a shaft and a beveled driving gear mounted in a housing and having operative connection with said drum shaft, a flexible drive shaft having connection with the power source of said truck and extending diametrically through said gear housing, gears freely mounted on said drive shaft and normally engaging said beveled gear, a dual clutch member slidable on said shaft, a spring controlled clutch actuating arm operatively connected to said clutch, means resisting said spring for effecting alternate engagement of said gears with respect to said drive shaft to drive said beveled gear and drum, and independent means for controlling said drum.

FREDRICK A. LOWER.